Sept. 12, 1967    H. N. FAIRBANKS ET AL    3,341,146
PHOTOSENSITIVE STRIP DRIVING SYSTEM
Filed Dec. 20, 1965    3 Sheets-Sheet 1

INVENTORS
HENRY N. FAIRBANKS
THOMAS M. MADIGAN
BY
Robert L. Nathans
ATTORNEYS

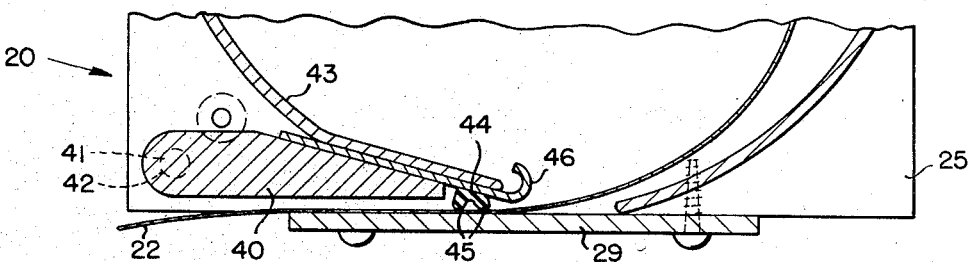
FIG. 3
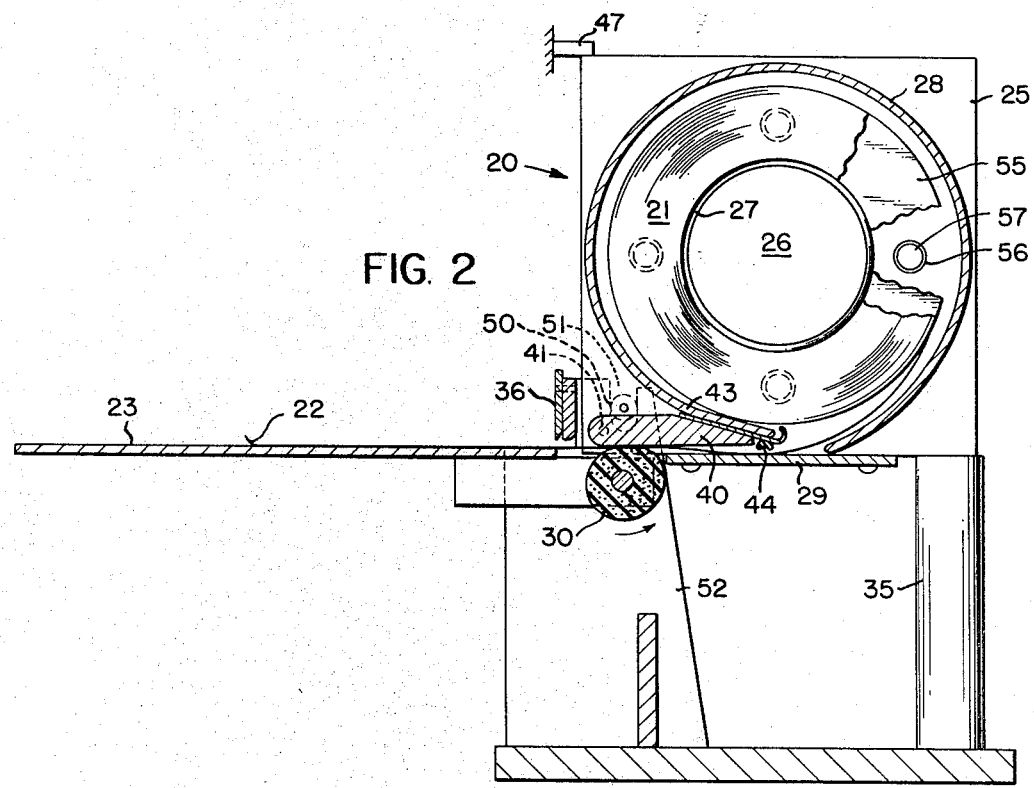
FIG. 2
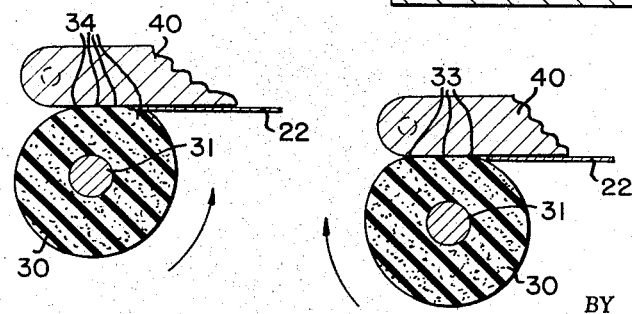
FIG. 4   FIG. 5
INVENTORS
HENRY N. FAIRBANKS
THOMAS M. MADIGAN
BY
ATTORNEYS

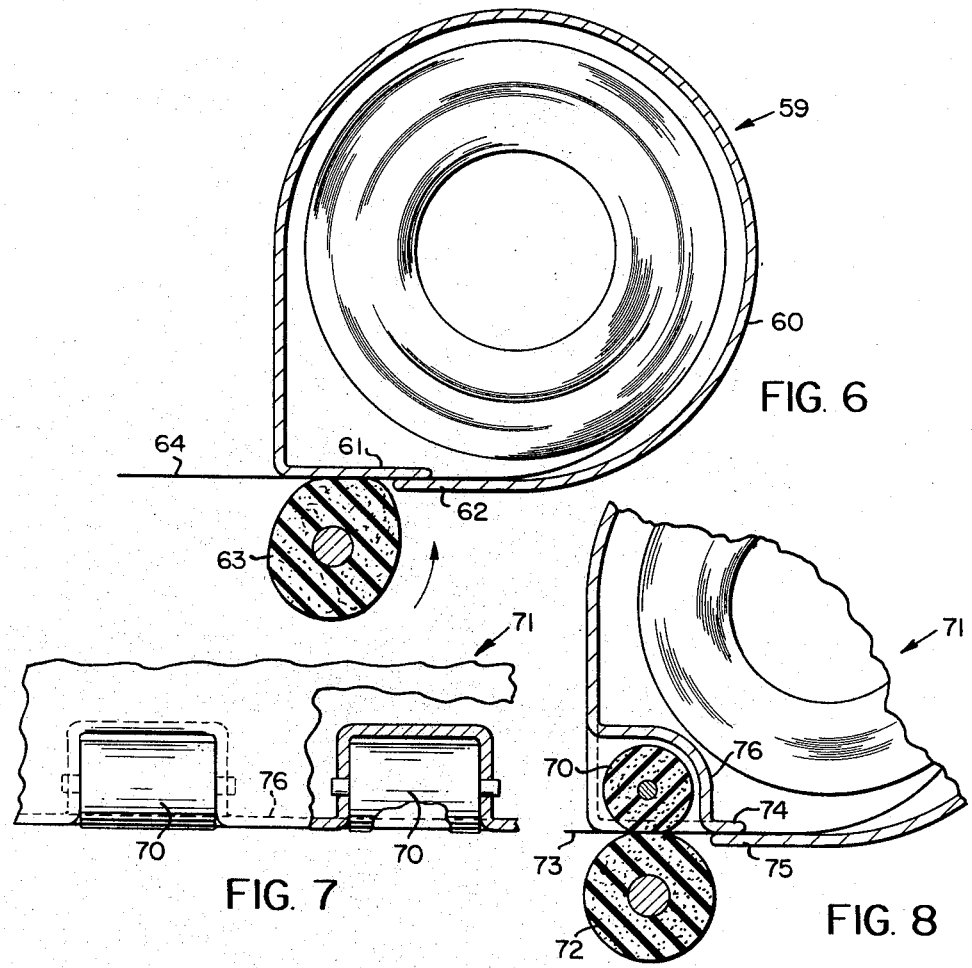

United States Patent Office 3,341,146
Patented Sept. 12, 1967

3,341,146
PHOTOSENSITIVE STRIP DRIVING SYSTEM
Henry N. Fairbanks, Penfield, and Thomas M. Madigan, Brighton, N.Y., assignors to Itek Corporation, Lexington, Mass., a corporation of Massachusetts
Filed Dec. 20, 1965, Ser. No. 514,957
28 Claims. (Cl. 242—71.1)

This invention relates to a photosenstive strip driving system that is useful in moving a photosensitive film or paper strip through photographic apparatus.

As a photosensitive strip driving system, the objects of the invention include, but are not limited to, the following:

(a) a new and improved cassette for such a strip;

(b) a drive mechanism that is simple, reliable, foolproof, and able to readvance the strip after it has been fully retracted as far as possible, without requiring any change of position of the drive means or the retracted strip;

(c) an economical and convenient coil-containing cassette that is simple to load and easy to position accurately relative to other apparatus in the system, that does not require threading of the strip into the associated apparatus, and that can be made cheaply enough to be disposable after use;

(d) easy loading, unloading, and interchanging of cassettes with minimum fogging of film from exposure to ambient light;

(e) cassettes that are usable in existing equipment with a minimum of change and adaptation;

(f) accurate tracking of the strip fed from a simple cassette so that alignment and registry of the strip in associated apparatus is assured;

(g) a simple cassette that is readily made light-tight and that is automatically closable to prevent any accidental movement of the strip; and (h) economical and automatic tracking of the strip along a predetermined path.

These and other objects of the invention will be apparent hereinafter from the specification, from the drawings which illustrate several preferred embodiments of the invention and which form a part of the disclosure, and from the subject matter claimed. Specific preferred embodiments of the invention will hereinafter be more fully described, the inventive subject matter being claimed at the end of this specification.

Generally, preferred embodiments of the invention comprise a drive means having a compressible and deformable roller that is retroverted as it is driven so that the contact area of the roller with the surface against which it is compressed moves longitudinally of the direction of feed for rotation of the roller in opposite directions. This allows the strip to be fully retracted and pushed as far back as possible into the cassette by such a drive roller, and then gripped by the same roller without any change of position of the strip or the roller when the roller is rotated in the opposite direction for subsequent advancement of the strip from the cassette. Such an arrangement prevents driving the strip all the way into the cassette or to a position from which it cannot be easily retracted, and yet allows a retracted strip to be advanced without changing the position of the drive mechanism.

In addition, a simple mechanism coacting with the drive roller is arranged for closing the opening in a cassette to provide a light seal and to hold the strip securely in place during shipment and any time the cassette is not in use, yet allowing the strip to be advanced freely when the cassette is secured in place relative to other apparatus in the system. Also, frictional braking of the coil is used to side guide the coil and to tension the strip against its own coil within the cassette, and such coil is accurately located whereby the coil itself provides the guide from which the strip is accurately tracked through associated apparatus.

Referring to the drawings:

FIG. 2 shows a partially cut-away, cross section of the apparatus of FIG. 1 taken along the line 2—2;

FIG. 3 shows an enlarged view of a portion of FIG. 2 illustrating the cassette-closing element;

FIGS. 4 and 5 show an enlarged cross-sectional view of the drive roller portion of FIG. 2 to illustrate the action of the drive roller means;

FIG. 6 shows a cross section view of a simple, related embodiment of the inventive film driving system;

FIGS. 7 and 8 show partially cut-away fragmentary front and side views respectively of another related embodiment of the inventive system;

FIG. 9 shows a plan view of another embodiment of a cassette-closing member according to the invention; and FIG. 10 shows a cross section view of the member of FIG. 9 taken along the line 10—10.

Figure 1:
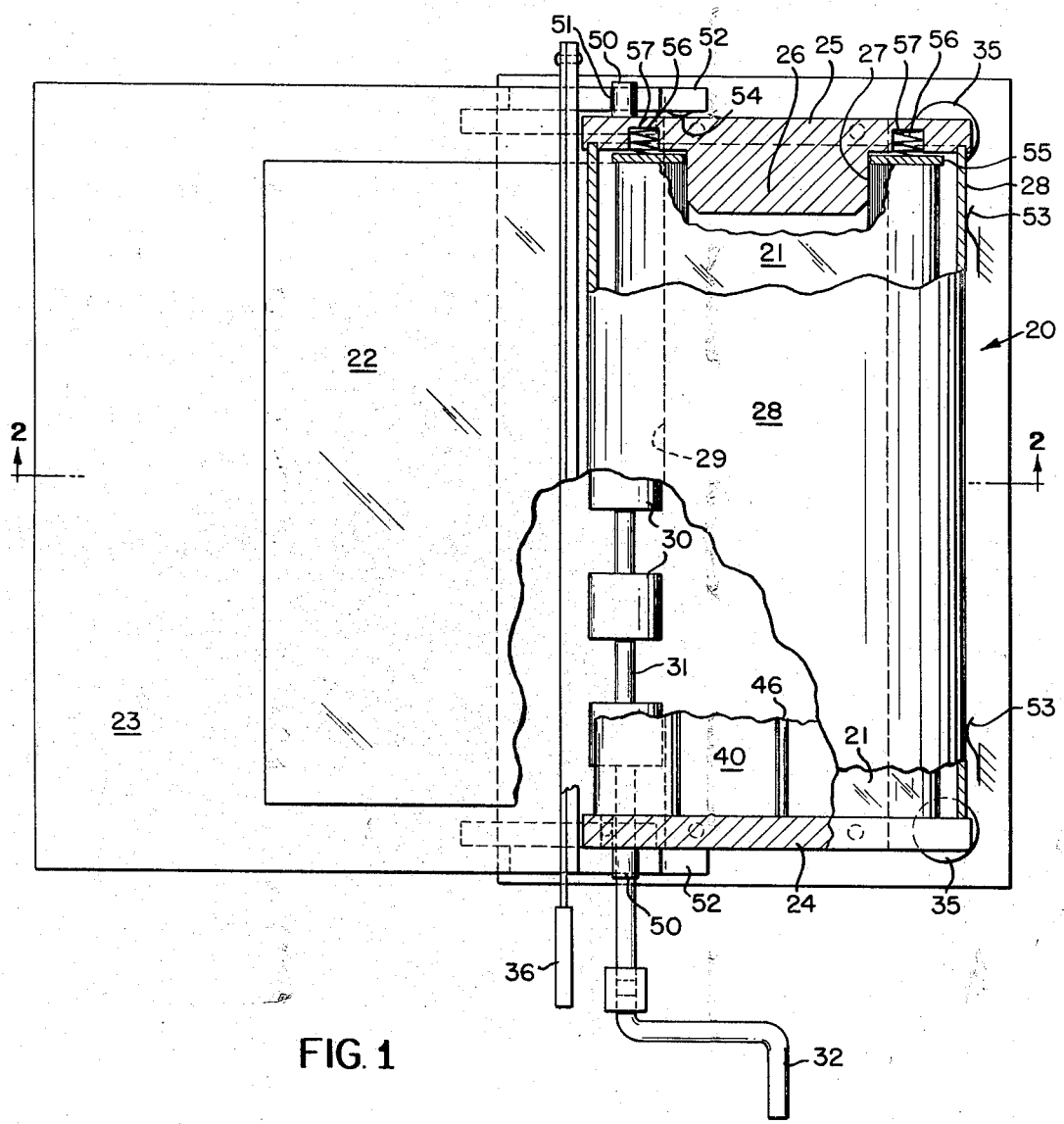
FIG. 1 shows a partially cut-away plan view of apparatus according to the invention.

The embodiment illustrated in FIGS. 1–5 includes a cassette 20 for housing a coil 21 of photosensitive strip material 22 such as paper, film, etc., and associated photographic apparatus 23 through which the strip 22 is driven from cassette 20.

Apparatus 23 can be any of a variety of devices with which cassette 20 is associated. For convenience of illustration, apparatus 23 is shown as the exposure zone of a camera, but it is understood that the inventive strip driving system is useful with other types of photographic apparatus.

Apparatus 23 also includes support means 35 for supporting cassette 20, and a cut-off knife 36 for severing a desired length of strip 22 from coil 21. Of course, support means 35, cut-off knife 36, and other elements of apparatus 23 can be varied widely within the spirit of the invention, and depend more upon the photographic apparatus in which the inventive strip driving system is incorporated than they do upon the system itself.

Cassette 20 is preferably, but not necessarily, light tight, and as illustrated in FIGS. 1 and 2, is formed with a pair of end members 24 and 25 each of which has a trunnion 26 such as shown on end member 25. Coil 21 is preferably wound on core 27, and trunnions 26 loosely support the inside of core 27 to support coil 21 for rotation within cassette 20. Wall 28 extends between end members 24 and 25 to enclose coil 21 within cassette 20. Any of a variety of means can be used to secure end members 24 and 25 together in engagement with wall 28, which may have several varying widths to accommodate varying spool lengths, and as illustrated in FIGS. 2 and 3, plate 29 accomplishes this. Of course, cassette 20 can be structured in a variety of ways, and the illustrated configuration is merely one preferred form of cassette.

A preferred strip driving element of the system is best illustrated in FIGS. 1, 2, 4 and 5. One or more compressible, deformable rollers 30 are fixed on a driven shaft 31. Shaft 31 is illustrated in FIG. 1 as driven by hand crank 32, but motor-powered or other drive means can be used for rotating shaft 31. Roller 30 can be formed as a single, preferably wide roller spaced along preferably a substantial porton of the width of strip 22, or can be a plurality of axially spaced, coaxial rollers 30 such as shown in FIG. 1. The illustrated plurality of rollers 30 is preferred, because relatively small, spaced rollers are more easily compressed and deformed according to the invention.

FIGS. 4 and 5 best show the operation of rollers 30. Since rollers 30 are formed of relatively soft and deformable material, they are easily compressed to conform with a surface against which they are pressed. Such a surface is provided by backing element 40 (to be described in detail below) or strip 22, which is normally disposed between rollers 30 and backing element 40. Also, rollers 30 are formed of material having a relatively high coefficient of friction to afford a good driving grip on strip 22.

Because rollers 30 are easily deformed, the frictional resistance offered by strip 22 or backing element 40 to the driving rotational force of rollers 30 pulls back or retroverts rollers 30. Thus, a portion of each roller 30 near its area of contact is deformed back by frictional resistance to be retroverted against the direction of feed of strip 22, and this changes the location of such contact area for opposite directions of rotation of roller 30.

In FIGS. 4 and 5 the position of strip 22 is the same, and the retroversional shifting of the area of contact for roller 30 for opposite directions of rotation is illustrated. Thus, for clockwise rotation as illustrated in FIG. 5, contact area 33 is to the left of the end of strip 22. For counterclockwise rotation of roller 30 as illustrated in FIG. 4, contact area 34 has shifted to the right and includes contact of roller 30 with strip 22.

The frictional retroversion of rollers 30 is applied to an important function in the inventive system. Occasionally, it is desirable to retract or push strip 22 back into cassette 20 after it has been advanced therefrom. One example of the need for this is in situations in which a length of strip 22 has been advanced into apparatus 23 for exposure, but before exposure is made, it is desired to switch to another cassette for a different width or type of photosensitive strip. Many circumstances can cause this, and it can easily occur in apparatus in which cut-off knife 36 is at the opposite end of the exposure zone 23 from cassette 20. On such occasions, rollers 30 are driven clockwise as illustrated in FIG. 5 to push strip 22 as far as possible back into cassette 20.

It is important that strip 22 not be pushed so far into cassette 20 that it is difficult or impossible to retract it for readvancement. To prevent this, various expedients such as sensing or metering devices could be used to stop the clockwise rotation of drive rollers 30 precisely at the point where a minimum, and automatically regrippable, amount of strip 22 remains extending from cassette 20, but the retroversion of rollers 30 affords a simpler and more advantageous solution to this problem. The position of strip 22 and roller 30 as illustrated in FIG. 5 shows the limit that roller 30 can push strip 22 in forcing it back into cassette 20. Roller 30 is positioned relative to cassette 20 so that strip 22, at the illustrated limit position, still extends an appropriately small amount from cassette 20. Cassette 20 can then be removed from apparatus 23 with minimum fogging of photosensitive material, and when it is desired to replace cassette 20 on apparatus 23 and readvance strip 22, it is merely necessary to return cassette 20 to its previous location.

Rotation of roller 30 counterclockwise as illustrated in FIG. 4 to readvance strip 22 produces the illustrated retroversion so that roller 30 effectively reaches back to grip strip 22, without any change in position of roller 30 or strip 22, and pulls strip 22 from cassette 20 for readvancement. Retrovertable rollers 30 thus eliminate the need for any of the more complex and sophisticated solutions to the strip-retracting problem by affording a very simple, economical, and reliable solution.

Deformable elements other than rollers such as endless belts and reciprocating surfaces can be used within the spirit of the invention. Also, drive rollers 30 can be forced against either stationary surfaces such as walls or moving surfaces such as rollers or belts. In the embodiment illustrated in FIGS. 1-5, backing element 40, toward which rollers 30 are forced, is formed as a pivotally mounted blade.

As best shown in FIG. 3, blade 40 is mounted for pivotal motion about an axis 41 such as by being mounted on pins 42 extending inwardly from the end members 24 and 25. Blade 40 is preferably biased downward toward engagement with plate 29. A variety of springs can be arranged for urging blade 40 downward, and in the illustrated embodiment, a movable end portion 43 of cassette wall 28 is formed of resilient material and arranged to force blade 40 pivotally downward toward plate 29.

Preferably, friction member 44 is mounted at the end of blade 40 to extend along the width of strip 22 to press strip 22 firmly against plate 29 when blade 40 is in its lowermost position under the bias of resilient wall portion 43. Friction strip 44 is preferably formed as generally U-shaped in cross section to engage strip 22 with a pair of contact ridges 45. Ridges 45 are preferably angled slightly away from each other as illustrated to offer maximum resistance to either pushing strip 22 into cassette 20 or pulling strip 22 out from cassette 20. The double ridges 45 additionally serve to insure a light-tight seal at the opening of cassette 20. Also, blade 40 is preferably provided with light-locking element 46 extending around the end of wall portion 43 to prevent any light leaks between wall portion 43 and blade 40.

When cassette 20 is positioned relative to apparatus 23 as illustrated in FIG. 2, rollers 30 are forced against blade 40 at a point spaced from axis 41 to pivot blade 40 upward against the bias of wall portion 43. This raises friction member 44 upward and out of contact with strip 22 and allows strip 22 to be fed freely out of cassette 20. If a change of cassettes is desired, blade 40 closes as soon as cassette 20 is removed from apparatus 23 to prevent any movement of strip 22 and again light-seal cassette 20.

The weight of cassette 20 can provide the force for urging rollers 30 and blade 40 together, but it is preferred that cassette 20 be positively located relative to apparatus 23 to insure optimum and uniform pressure between rollers 30 and blade 40. Any of a variety of positive interlocks are suitable for this purpose. Such positive interlocks are schematically represented by fixed abutment member 47 positioned to hold cassette 20 down to a predetermined optimum position.

Of course, rollers 30 can be incorporated into cassette 20 with or without blade 40, or rollers or fixed backing surfaces can be substituted for pivoted backing element 40 within the spirit of the invention. Also, the relative positions of rollers and blades can be interchanged or both can be mounted together, either on the cassette or on associated apparatus.

For many applications of the inventive system, it is important that strip 22 track accurately and stay in proper alignment through apparatus 23. The inventive system includes a simple and reliable device for insuring such alignment.

Cassette 20 is accurately located relative to apparatus 23 preferably by positive interlock location means. A variety of abutments, location surfaces, etc., are suitable for such accurate locating, and in the embodiment illustrated in FIGS. 1 and 2, pins 50, extending outward from end members 24 and 25, are lodged in slots 51 in side abutment members 52. It is preferred that resilient means such as springs 53 urge cassette 20 forward to locate pins 50 against the forward edge of slots 51. Also, it is preferred that a spring 54, fixed to one of the abutment members 52, urge cassette 20 sideways into locating contact with the other abutment member 52. Of course, pins 50 and slots 51 can be interchanged between cassette 20 and apparatus 23, and other positive location means can be used within the spirit of the invention. Generally, it is preferred that by accurate configuration of end members 24 and 25 and correspondingly accurate configuration of apparatus 23, cassette 20 can be placed in an accurately predetermined position relative to apparatus 23. In turn trunnions 26 and coil 21 are then accurately positioned relative to apparatus 23.

It is preferred that one end of cassette 20 serve as an axial location means for coil 21. As best shown in FIG.

1, the inner face of end member 24 serves as an abutment surface for one end of coil 21. It is preferred that coil 21 be resiliently urged against such abutment surface, and as illustrated in FIG. 1, an annular ring 55 is disposed over trunnion 26 and urged by springs 56 against the inner face of end member 24. Springs 56 are illustrated as housed in recesses 57 in end member 25, but, of course, other spring arrangements and other resilient means can also be used.

The biasing of coil 21 against end member 24 by ring 55 not only locates coil 21 axially, but produces friction at the ends of coil 21 acting as a brake or drag on coil 21. Such braking effect, which is an important feature of the invention, produces a tension in strip 22 between coil 21 and drive rollers 30, and the resultant load from such tension appears along a line generally at the back side of said coil. Accurate location of coil 21 normal to the desired path for strip 22 in turn sets the resultant friction load line normal to such path. Strip 22 is governed in its path through apparatus 23 by the angle of the resultant tension load line from which it is drawn, the assumed path for strip 22 being normal to such tension load line. Thus, by accurate positioning of coil 21, the rearward side of such coil can serve as the loadbearing member for determining the path that strip 22 will tend to assume in traveling through apparatus 23. This eliminates the need for any additional guide or load-directing means and produces accurate guiding by a simple and reliable device.

In other words, if the film commences to "walk" on emerging from the magazine at an angle with respect to the correct feed line (which is normal to the longitudinal supply spool axis), the frictional braking force applied to the ends of the coil by ring 55 will rapidly correct this angular deviation. The side of the strip having the longest path from the coil to the drive mechanism will be under greatest tension, and the strip will seek the path in which tensions upon it are balanced. This path will be the desired path normal to the axis of the coil.

Formation of cassette 20 according to the embodiment illustrated in FIGS. 1–5 has economical advantages in that end members 24 and 25 can be accurately made and intended for use with different widths of walls 28 to accommodate different widths of coils 21. This allows relatively more expensive end members to be reused in a variety of widths of cassettes and allows disposal and interchangeability of the relatively inexpensive wall 28.

A simple, inventive drive system embodiment that is preferred for its economy is illustrated in FIG. 6. In this embodiment, wall 60 of cassette 59 is formed of a single piece of resilient material that is biased so that wall portion 61 is urged toward wall portion 62 for normally closing the outlet opening of cassette 59. When cassette 59 is properly located in the strip driving system, roller 63 is forced toward cassette wall portion 61 for engaging strip 64 and moving wall portion 61 away from wall portion 62 to open the cassette. Roller 63 is formed of the soft, deformably and retrovertable material previously described, and operates as explained above for advancing and retracting strip 64.

A double roller embodiment for the inventive system is illustrated in FIGS. 7 and 8. Rollers 70 are mounted adjacent cassette 71 and can be either supported by cassette 71 as illustrated or by apparatus with which the cassette is associated. Deformable, retrovertable rollers 72 mounted on associated apparatus are pressed toward rollers 70 for driving strip 73 for advancement and retraction in the manner described above. The opening for cassette 71 is similar to that of cassette 59 in that it is formed by resilient cassette wall portions 74 and 75 with the cooperation of resilient wall portion 76 forming a recess for rollers 70.

Rollers 70 can also be of the deformable type, or the respective positions of rollers 70 and 72 can be interchanged within the spirit of the invention. Also, rollers 72 can be mounted along with rollers 70 either on cassette 71 or on associated apparatus as desired. In any of these arrangements the driven rollers are preferably of the retrovertable type.

Backing blade 80, as illustrated in FIGS. 9 and 10, can be substituted for backing blade 40 previously described. The function of blade 80 is similar to that of blade 40 except that blade 80 includes rollers 81 arranged opposite drive rollers 30 to afford a rolling backing surface against which deformable rollers are pressed. Blade 80 is mounted for pivotal motion about pins 82 that are housed in suitable recesses formed in the end members for the cassette. Strip 83 and light lock 84 function in the same way as strip 44 and light lock 46, previously described.

From the above description of preferred embodiments, it can be seen that the inventive system includes a convenient cassette that can be positioned easily and accurately in a piece of photographic apparatus and from which a photosensitive strip can be advanced and retracted by a simple and reliable drive mechanism. In normal use and abuse of such a cassette, the photosensitive strip will not be pulled from it unintentionally in ambient light to be fogged and wasted, nor will the strip be accidentally pushed into the cassette to a position from which it cannot be retrieved. Different widths of cassettes can be easily constructed, cassette parts can be made interchangeable, and cassettes can be made cheaply enough to be disposable after use. A cassette can be removed from its associated apparatus with a minimum loss of photosensitive material, and cassettes can be readily interchanged. Also, a minimum restructuring of existing apparatus will accommodate the inventive cassette and drive system.

Other features, advantages, and other specific embodiments of this invention will be apparent to those exercising ordinary skill in the pertinent art after considering the foregoing disclosure. In this regard, while specific preferred embodiments of the invention have been described in considerable detail, such disclosure is intended as illustrative, rather than limiting, and other embodiments, variations and modifications can be effected within the spirit and scope of the invention as disclosed and claimed.

We claim:
1. A strip driving device comprising:
 (a) cooperable first and second transport elements, one of which includes a nonrotatable backing element and one of which is readily deformable, said strip being normally disposed between said first and second elements;
 (b) means for moving said movable transport element to move said strip; and
 (c) means for urging said first and second elements toward each other with force sufficient to deform said deformable element in the region of its area of contact normally with said strip and to retrovert the position of said contact area to a significant extent upon motion of said movable element.

2. The device of claim 1 wherein said first transport element is both movable and readily deformable, said second transport element comprises a backing element, and said contact area is retroverted relative to motion of said strip.

3. The device of claim 2 wherein said first transport element is arranged for movement in two opposite directions for advancing and retracting said strip, and said contact area is retroverted for each direction of motion of said first element.

4. The device of claim 2 wherein said first transport element comprises roller means.

5. The device of claim 4 wherein said roller means is arranged for rotation in two directions for advancing and retracting said strip, and said contact area is retroverted for each direction of rotation of said roller means.

6. The device of claim 2 wherein said backing element comprises a generally flat surface that is substantially fixed in position relative to longitudinal movement of said strip.

7. The device of claim 2 wherein said backing element comprises rotatable roller means.

8. The device of claim 2 in combination with photographic apparatus comprising a cassette, a coil of said strip supported for rotation within said cassette, said cassette being provided with an opening through which said strip is led, and said first transport element being arranged near said opening.

9. The device of claim 5 in combination with photographic apparatus comprising a cassette, a coil of said strip supported for rotation within said cassette, said cassette being provided with an opening through which said strip is led, and said roller means being arranged near said opening.

10. The combination of claim 9 wherein said backing element is arranged on said cassette and said roller means is mounted on an associated element of said apparatus, and including means for accurately locating said cassette relative to said associated element.

11. A strip driving device comprising:
 (a) a readily, friction drive roller means;
 (b) a backing element disposed adjacent said roller means, said strip being normally disposed between said backing element and said roller means;
 (c) means for urging said roller means and said backing element toward each other to press a contact area of said roller means normally against said strip; and
 (d) means for rotating said roller means for moving said strip, rotation of said roller means causing said contact area to be retroverted to a significant extent due to the readily deformable nature of said drive roller and the frictional force between said drive roller and said backing element.

12. The device of claim 11 wherein said rotating means is arranged to rotate said roller means in two opposite directions for advancing and retracting said strip, and said contact area is retroverted for each direction of rotation of said roller means.

13. The device of claim 12 in combination with photographic apparatus comprising a cassette, a coil of said strip supported for rotation within said cassette, said cassette being provided with an opening through which said strip is led, and said roller means being arranged near said opening.

14. The combination of claim 13 wherein said backing element is arranged on said cassette and said roller means is mounted on an associated element of said apparatus, and including means for accurately locating said cassette relative to said associated element.

15. The combination of claim 14 wherein said backing element comprises a pivotally mounted blade biased toward a first position in which it closes said opening and moved against said bias by pressure from said roller means to a second position in which it opens said opening.

16. The combination of claim 15 wherein said backing element includes a friction surface for engaging said strip when said backing element is in said first position and a member arranged for light locking the joint between said backing element and adjacent portions of said cassette.

17. The combination of claim 16 wherein said cassette includes a resilient wall engaging and biasing said blade toward said first position.

18. The device of claim 11 wherein said backing element comprises roll means disposed opposite said drive roller means.

19. The combination of claim 15 wherein said blade comprises roll means disposed opposite said drive roller means.

20. The combination of claim 13 wherein said cassette includes a pair of end members for supporting said coil, wall means extending between said end members, and resilient means arranged on one of said end members for urging said coil into engagement with the other of said end members.

21. The combination of claim 20 including means for accurately locating said cassette relative to an associated element of said apparatus and wherein said locating means disposes said coil accurately normal to the direction of travel of said strip in said apparatus, and said resilient means produces a resultant friction load appearing on a surface of said coil normal to said direction of travel so that said coil accurately controls the tracking of said strip within said apparatus.

22. The combination of claim 20 wherein said coil is wound on a hollow core, said end members each include a trunnion fitting loosely within said hollow core, and wherein an annular, trunnion-encircling ring is arranged on one of said end members and biased to engage one end of said coil.

23. The combination of claim 20 including several different interchangeable widths of said wall means and means for securing said end members into engagement with any width of said wall means to accommodate different widths of coil within said cassette.

24. The device of claim 12 wherein said roller means comprises a plurality of rollers fixed to a common shaft and spaced axially along said shaft, each of said rollers being deformable.

25. In a cassette for a coil of photosensitive strip material, the improvement comprising:
 (a) a closure member movably mounted in the region of the opening of said cassette;
 (b) resilient means for urging said closure member toward a closed position, said closure member being movable against the bias of said resilient means, away from said closed position to open said cassette; and
 (c) friction means on said closure member for engaging said strip in the region of said opening to resist movement of said strip and to light lock said opening.

26. The device of claim 25 wherein said closure member comprises a pivotally mounted blade including a light-lock strip overlapping the juncture of said blade and an adjacent wall of said cassette.

27. The device of claim 25 wherein said resilient means comprises a portion of the wall of said cassette.

28. The device of claim 26 in combination with photographic apparatus including elements of an advancing means for said strip and including means for locating said cassette relative to said apparatus so that said element of said strip advancing means is pressed toward said blade for moving said blade from said closed position when said cassette is disposed for strip advancement.

References Cited

UNITED STATES PATENTS

| | | | |
|---|---|---|---|
| 1,186,653 | 6/1916 | Folmer | 242—71 |
| 1,363,217 | 12/1920 | Backus | 242—71.1 |
| 2,298,574 | 10/1942 | Lockhart | 242—71.1 |
| 2,534,015 | 12/1950 | Gerstein et al. | 242—67.2 |

FRANK J. COHEN, *Primary Examiner.*

N. L. MINTZ, *Assistant Examiner.*